United States Patent
Chan et al.

(10) Patent No.: US 9,674,185 B2
(45) Date of Patent: Jun. 6, 2017

(54) AUTHENTICATION USING INDIVIDUAL'S INHERENT EXPRESSION AS SECONDARY SIGNATURE

(71) Applicant: INTERNATIONAL BUSINESS MACHINES CORPORATION, Armonk, NY (US)

(72) Inventors: Yuk L. Chan, Rochester, NY (US); Michael D. Essenmacher, Danbury, CT (US); David B. Lection, Raleigh, NC (US); Eric L. Masselle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/608,308

(22) Filed: Jan. 29, 2015

(65) Prior Publication Data

US 2016/0226866 A1   Aug. 4, 2016

(51) Int. Cl.
   G06F 7/04       (2006.01)
   H04L 29/06      (2006.01)
   G06N 99/00      (2010.01)

(52) U.S. Cl.
   CPC ....... *H04L 63/0861* (2013.01); *G06N 99/005* (2013.01); *H04L 2463/082* (2013.01)

(58) Field of Classification Search
   CPC .................................................... G06F 21/32
   USPC .............................. 713/182–186; 726/26–30
   See application file for complete search history.

(56) References Cited

U.S. PATENT DOCUMENTS

| | | | |
|---|---|---|---|
| 7,536,657 B2 | 5/2009 | Shimizu et al. | |
| 8,159,328 B2 | 4/2012 | Luckhardt | |
| 8,368,510 B2 | 2/2013 | Luckhardt | |
| 8,627,096 B2 | 1/2014 | Azar et al. | |
| 2007/0250920 A1* | 10/2007 | Lindsay | G06F 21/31 726/7 |
| 2008/0273764 A1 | 11/2008 | Scholl | |
| 2009/0049555 A1* | 2/2009 | Cho | G06F 21/32 726/26 |
| 2011/0039528 A1* | 2/2011 | Yi | G08G 1/20 455/418 |

(Continued)

FOREIGN PATENT DOCUMENTS

WO    2006003599    1/2006

OTHER PUBLICATIONS

Meng et al., "Surveying the Development of Biometric User Authentication on Mobile Phones," IEEE Communications Surveys & Tutorials Year: 2015, vol. 17, Issue: 3 pp. 1268-1293.*

(Continued)

*Primary Examiner* — Roderick Tolentino
(74) *Attorney, Agent, or Firm* — Tutunjian & Bitetto, P.C.; Kurt Goudy (57) ABSTRACT

A method and system are provided. The method includes training for one or more secondary signatures of a user. The method further includes identifying one or more inherent expressions of the user as the one or more secondary signatures. The method also includes authenticating the user using a primary signature and at least one of the one or more secondary signatures. The one or more inherent expressions are unintended expressions performed by the user in relation to the user providing the primary signature.

18 Claims, 4 Drawing Sheets

(56) References Cited

U.S. PATENT DOCUMENTS

| | | | |
|---|---|---|---|
| 2011/0274318 A1* | 11/2011 | Shindo | A61B 5/117 382/115 |
| 2012/0144204 A1* | 6/2012 | Litz | G07C 9/00158 713/186 |
| 2012/0313746 A1* | 12/2012 | Rahman | A61B 5/0024 340/5.1 |
| 2014/0059673 A1 | 2/2014 | Azar et al. | |
| 2014/0089672 A1* | 3/2014 | Luna | H04L 9/3231 713/186 |
| 2014/0188481 A1* | 7/2014 | Kulkarni | G10L 17/00 704/273 |
| 2016/0072803 A1* | 3/2016 | Holz | G06F 21/42 726/7 |
| 2016/0179554 A1* | 6/2016 | Khosravi | G06F 9/4406 726/1 |

OTHER PUBLICATIONS

Fujii et al., "SV-2FA: Two-factor user authentication with SMS and voiceprint challenge response," 8th International Conference for Internet Technology and Secured Transactions (ICITST-2013) Year: 2013 pp. 283-287.*

Pisano, C., et al. "Freeform Gesture Authentication" Freeform Gesture Authentication, ECE Senior Capstone, Rutgers University. May 2014. p. 1-10.

Ratha, N. K., et al. "Enhancing security and privacy in biometrics-based authentication systems" IBM Systems Journal. vol. 40. No. 3. 2001. pp. 614-634.

Zhang, L., et al. "Online Finger-Knuckle-Print Verification for Personal Authentication" Pattern Recognition, vol. 43, No. 7. Jul. 2010. pp. 1-26.

* cited by examiner

AUTHENTICATION USING INDIVIDUAL'S INHERENT EXPRESSION AS SECONDARY SIGNATURE

BACKGROUND

Technical Field

The present invention relates generally to authentication and, in particular, to authentication using an individual's inherent expression as a secondary signature.

Description of the Related Art

Security mechanisms such as passwords or pins are a necessary part of everyone's life, whether they are an automated teller machine (ATM) card pin or a password for logging onto a social networking service. Managing passwords becomes a headache for many people. Numerous online accounts, different password policies (such as expiration time period, password length, password format) multiply this inconvenience, making users desire a simpler solution. On the other hand, the availability of powerful and yet simple-to-use hacker tools, widespread viruses and Trojans, global access for hackers, and the severe consequences of being hacked (such as identify theft) argue for stronger and more complicated passwords. Thus, a simpler to use security mechanism that still provides strong security is needed.

SUMMARY

According to an aspect of the present principles, a method is provided. The method includes training for one or more secondary signatures of a user. The method further includes identifying one or more inherent expressions of the user as the one or more secondary signatures. The method also includes authenticating the user using a primary signature and at least one of the one or more secondary signatures. The one or more inherent expressions are unintended expressions performed by the user in relation to the user providing the primary signature.

According to another aspect of the present principles, a system is provided. The system includes a secondary signature trainer for training for one or more secondary signatures of a user. The system further includes an inherent expression as a secondary signature evaluator for identifying one or more inherent expressions of the user as the one or more secondary signatures. The system also includes a user authentication device for authenticating the user using a primary signature and at least one of the one or more secondary signatures. The one or more inherent expressions are unintended expressions performed by the user in relation to the user providing the primary signature.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to authentication using an individual's inherent expression as a secondary signature. Such inherent expression can include, for example, gestures, other body movements, speech, noise, shutter, lisp and other inherent characteristics specific to the individual such as blood pressure, heart rate, and/or brain wave. Advantageously, the secondary signature provides increased security to bolster the use of a primary signature. As used herein, the term "primary signature" refers to the first and primary input a user provides when being authenticated. Examples of primary signatures include, but are not limited to, entry of a password by typing or voice, or other input form, entry of a specific gesture, retina scan, or other biometric entry.

Thus, the present principles can apply to multi-factor authentication access, where more than one authentication factor is used to identify an individual. We note that such multi-factor authentication access typically involves multiple authentication factors from different categories.

Figure 1:
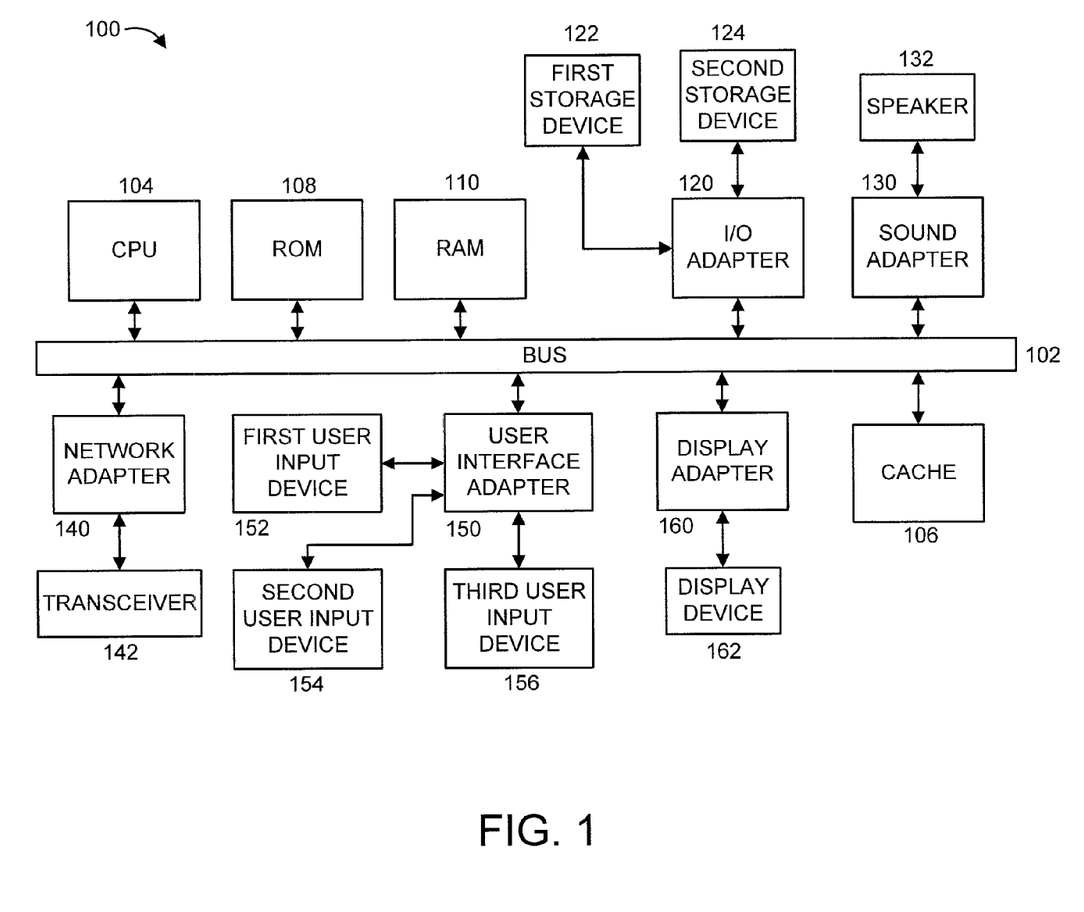
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a brain wave monitor, a heart rate or blood pressure monitor, a system incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
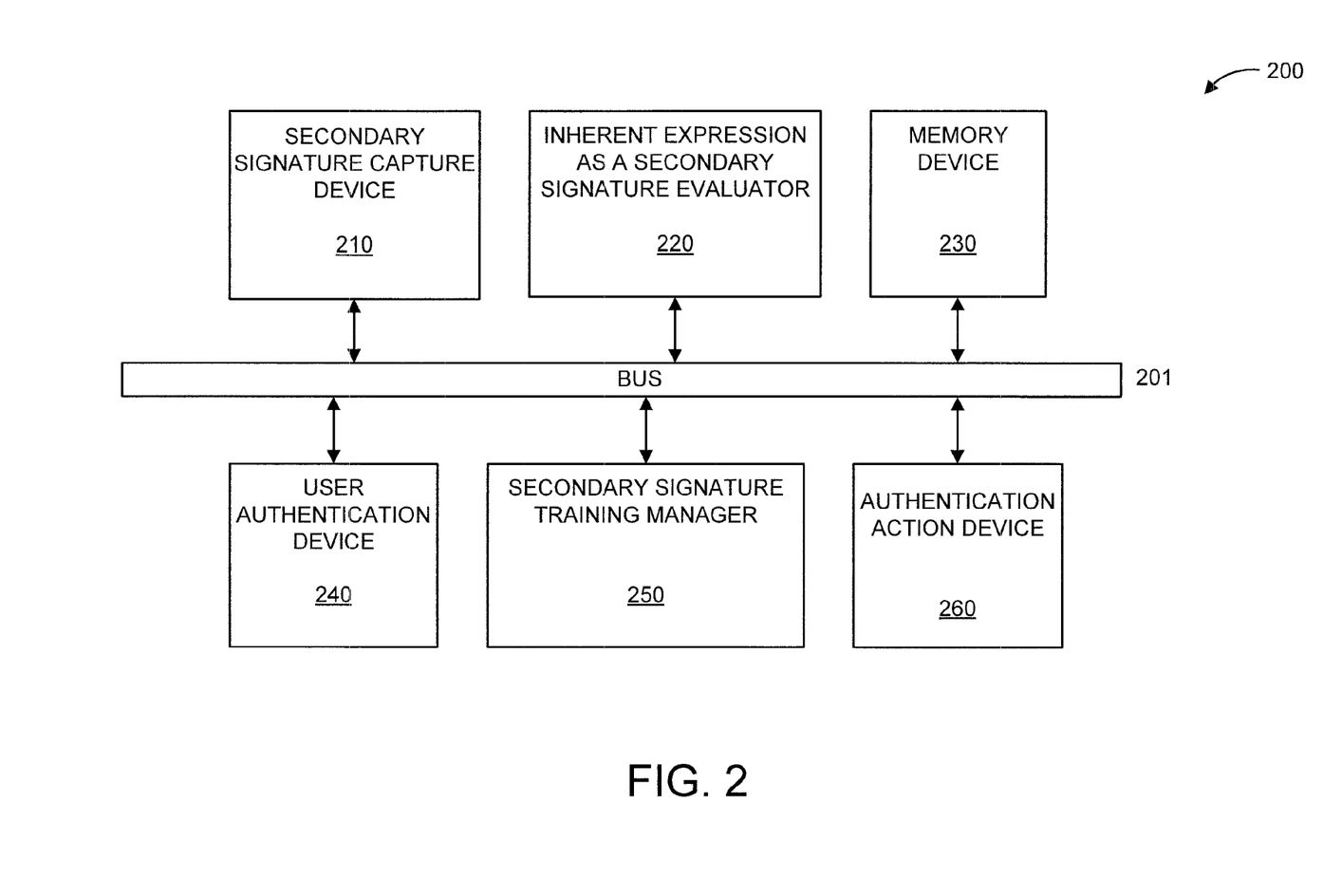
FIG. 2 shows an exemplary system 200 for authenticating a user using the user's inherent expression as a secondary signature, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
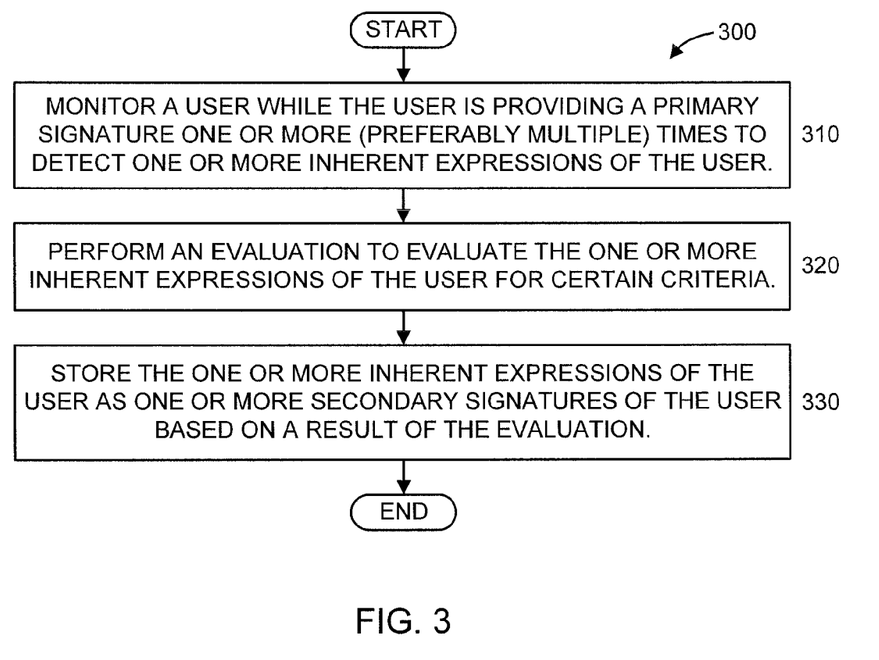
FIG. 3 shows an exemplary method 300 for training for one or more secondary signatures, in accordance with an embodiment of the present principles.
Figure 4:
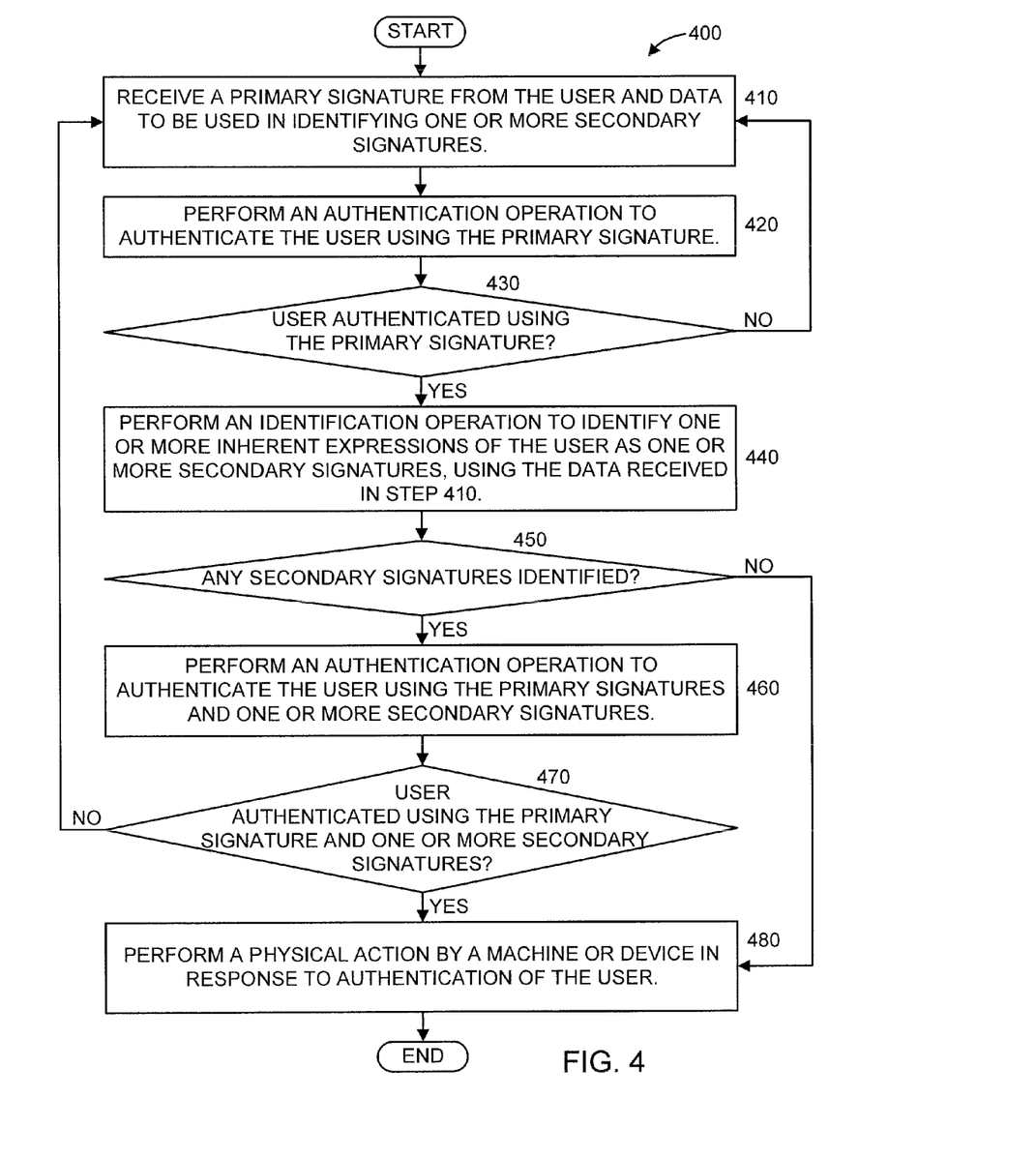
FIG. 4 shows an exemplary method 400 for authenticating a user, in accordance with an embodiment of the present principles.

Further, it is to be appreciated that processing system 100 may perform at least part of the method described herein including, for example, at least part of method 300 of FIG. 3 and/or at least part of method 400 of FIG. 4. Similarly, part or all of system 200 may be used to perform at least part of method 300 of FIG. 3 and/or at least part of method 400 of FIG. 4.

FIG. 2 shows an exemplary system 200 for authenticating a user using the user's inherent expression as a secondary signature, in accordance with an embodiment of the present principles.

The system 200 includes a secondary signature capture device 210, an inherent expression as a secondary signature evaluator 220, a memory device 230, a user authentication device 240, a secondary signature training manager 250, and an authentication action device 260.

The secondary signature capture device 210 captures one or more secondary signatures from the user. The secondary signature capture device 210 can include one or more of a microphone, a brain wave monitor, a heart rate monitor, a blood pressure monitor, a visual monitoring device, and so forth. In an embodiment where the secondary signature capture device 210 includes the visual monitoring device, the visual monitoring device monitors the actions (e.g., gestures and/or movements) of a user. In such an embodiment, the visual monitoring device includes an image capture device such as a video camcorder, a gesture/movement recognition device, and so forth. However, any of the other aforementioned devices can replace and/or supplement the visual monitoring device included in the secondary signature capture device 210.

The inherent expression as a secondary signature evaluator 220 evaluates inherent expressions of the user (that are expressed while the user is providing the primary signature) for suitability as secondary signatures. The evaluation is based on certain criterion/criteria including, but not limited to, similarity, probability of occurrence, and so forth.

The memory device 230 stores a primary signature that is used to authenticate the user. The memory device 230 also stores the one or more secondary signatures of the user that are used for authentication of the user, based on a result of the evaluation (performed by the inherent expression as a secondary signature evaluator 220).

The user authentication device 240 authenticates the user using the primary signature and at least one of the one or more secondary signatures.

The secondary signature training manager 250 manages the training of secondary signatures. The training manager can include determining when to invoke training. In an embodiment, the training manager 250 can invoke training based on the occurrence of certain conditions. In an embodiment, the one or more given conditions can include, but are not limited to, the elapsing of a predetermined amount of time, the occurrence of a predetermined number of authentications using at least one of the one or more secondary signatures, and so forth. In an embodiment, the given condition can be any session where the user is providing the primary signature so as to provide a continuous learning environment that accommodates, for example, habitual or environmental changes. These and other conditions are readily determined by one of ordinary skill in the art given the teachings of the present principles provided herein, while maintaining the spirit of the present principles.

Moreover, in an embodiment, the training manager 250 can perform gesture modeling of any inherent expressions performed by the user. One or more models may be used for a given inherent expression. Each model can represent a slight variation in a given inherent expression.

The authentication action device 260 performs a physical action using a machine or device, or causes the machine or device to perform the physical action, responsive to authentication of the user. The physical action by a machine or device can include, but is not limited to, unlocking a lock on a door or a physical device, automatically opening a non-manually operated door, providing access to a facility or item, and so forth. These and other actions are readily determined by one of ordinary skill in the art, given the teachings of the present principles provided herein.

In the embodiment of FIG. 2, the visual monitoring device 210, the inherent expression as a secondary signature evaluator 220, the memory device 230, and the second signature training manager 250 are part of a secondary signature trainer 299. However, it is to be noted that the visual monitoring device 210 can also serve to identify a primary signature. However, in other embodiments, separate devices can be used to detect the primary signature and secondary signatures.

Of course, the system 200 may also include other elements (not shown), as readily contemplated by one of skill in the art, as well as omit certain elements. Moreover, other arrangements of the elements of system 200 can be used. For example, while one or more elements of system 200 are shown as separate devices, in other embodiments, two or more of the elements can be combined into an integrated element. We note that in the embodiment shown in FIG. 2, the elements thereof are interconnected by a bus 201. However, in other embodiments, other types of connections can also be used. Moreover, in an embodiment, at least one of the elements of system 200 is processor-based. These and other variations of the elements of system 200 are readily contemplated by one of ordinary skill in the art given the teachings of the present principles provided herein, while maintaining the spirit of the present principles. As an example, the input devices could involve the touch screen on a smart phone and the blood pressure sensor provided on a wristwatch.

FIG. 3 shows an exemplary method 300 for training for one or more secondary signatures, in accordance with an embodiment of the present principles.

At step 310, monitor a user while the user is providing a primary signature one or more (preferably multiple) times to detect one or more inherent expressions of the user. The one or more inherent expressions are unintended expressions performed by the user. The unintended expressions can include gestures, movements, sounds, heart rate value, blood pressure value and/or brain wave activities of the user. The preceding unintended expressions are merely illustrative and, thus, other unintended expressions can also be used while maintaining the spirit of the present principles.

At step 320, perform an evaluation to evaluate the one or more inherent expressions of the user for certain criteria. The criteria can include, but is not limited to, one or more of the following: similarity; probability of reoccurrence; and so forth.

At step 330, store the one or more inherent expressions of the user as one or more secondary signatures of the user based on a result of the evaluation.

FIG. 4 shows an exemplary method 400 for authenticating a user, in accordance with an embodiment of the present principles. The method 400 uses the user's inherent expression as a secondary signature for authentication.

At step 410, receive (i) a primary signature from the user and (ii) data to be used in identifying one or more secondary signatures. Such data can include, but is not limited to, one or more gestures (e.g., movements or static positions) performed by the user, sounds produced by the user, a heart rate of the user, a blood pressure of the user, a brain wave of the user, and any other inherent expression made by the user in relation to the user providing the primary signature.

At step 420, perform an authentication operation to authenticate the user using the primary signature.

At step 430, determine whether or not the user has been authenticated using the primary signature. If so, then the method proceeds to step 440. Otherwise, the method returns to step 410.

At step 440, perform an identification operation to identify one or more inherent expressions of the user as one or more secondary signatures, using the data received in step 410. Such identification can be based on, for example, a comparison of the data to training data or sample data including expected inherent user expressions that can be used as secondary signatures.

At step 450, determine whether any secondary signatures have been identified. If so, then the method proceeds to step 460. Otherwise, the method proceeds to step 480.

At step 460, perform an authentication operation to authenticate the user using the primary signature and one or more of the secondary signatures (identified at step 440).

At step 470, determine whether or not the user has been authenticated using the primary signature and one or more of the secondary signatures. If so, then the method proceeds to step 480. Otherwise, the method returns to step 410.

At step 480, perform a physical action by a machine or device in response to authentication of the user. The physical action by a machine or device can include, but is not limited to, unlocking a lock on a door or a physical device, automatically opening a non-manually operated door, providing access to a facility or item, and so forth. These and other actions are readily determined by one of ordinary skill in the art, given the teachings of the present principles provided herein.

It is to be appreciated that one or more steps of method 400 can involve training on-the-fly in order to update and/or replace any of the one or more secondary signatures. The training can be performed during the next time(s) when the user provides the primary signature in an authentication operation (e.g., step 450). Such next time(s) can involve simply training without actual authentication or can be performing during subsequent authentication sessions to provide seamless further training for a user's secondary signature(s). These and other variations of the present principles are readily determined by one of ordinary skill in the art given the teachings of the present principles provided herein, while maintaining the spirit of the present principles.

Very often, authentication can have multiple levels. Let us consider a user unlocking an Android® phone through the 9-Dots Pattern authentication mechanism. First, the order of transversal through a subset of the 9-Dot is the primary password (or signature). Second, behavioral biometrics such as the speed of drawing when connecting two dots are used to enhance the primary password. This type of behavioral biometric is captured based on the physical interaction (touching) between a user and an input device, and is focused on capturing data related to intentional actions.

The present principles introduce another level of authentication using the person's inherent and unintended gestures. These gestures are not directly related to the physical, intentional interaction between the user and the input device. Yet, these unintended actions occur coincidentally with the intended physical actions involved with providing the primary signature (i.e., the finger swiping action). For example, a user uses his right hand index finger to swipe a pattern for the 9-Dots Pattern on the Android® phone, and this user has a habit of curling the pinky (little finger) while he connects the last two dots. As long as the curling of the pinky during the last two dots is a repeating habit, it can be used as part of a secondary signature to strengthen security around the primary signature. On the other hand, curling the pinky would not be used as a signature if the user was using the middle finger, or using any finger on the left hand to perform the swipe. Without the secondary signature for authentication (i.e., a less secure situation), it's up to the application to decide if access should be granted, whether a warning email should be send to the user, and so forth. Some of these inherent unintentional gestures or movements will occur across entry of many primary signatures. On the other hand, as the primary signature changes, the secondary signature (the inherent unintended gesture) may also change.

The present principles can be implemented using various gesture modeling and detection technology available today as the enabling technology. As these technologies become more mature, more precise and detailed gesture tracking and modeling will be available and the present principles will be enhanced at the same time.

A person's inherent gesture suggested by the present principles could be either pre-trained or trained-as-you-go. The training includes gesture modeling, where the movement of your fingers could be recognized and kept in a data structure. As the same password is input over and over again, multiple data structures representing the multiple occurrences are available. The content of data structure across these multiple occurrences is analyzed for similarity, and probability of reoccurrence. The specific action that has a high probability of reoccurrence becomes a candidate for the secondary signature.

The train-as-you-go process happens continuously (through continuous learning) to accommodate habitual or environmental changes. For example, 3 habitual gestures were initially identified as secondary signatures. Then the user hurt his pinky, which can no longer curl. While the pinky is healing, the other 2 gestures could be used as a secondary signature(s) while new habitual gestures could be detected (new habitual gestures might be available because of the changes to the pinky). The continuous learning could also be used in conjunction with other secondary signature such as the behavioral biometrics described earlier. In addition, the multiple secondary signatures can complement each other when a particular secondary signature does not reliably occur along with the primary signature the majority of the time. For example, gesture 1 happens 70% of time, gesture 2 happens 80% of time, gesture 3 happens 60% of time, and gesture 4 happens 70% of time. It is possible to determine based on historical occurrences that 2 out of the 4 gestures will happen together 99% of time. And, these 4 gestures would create a group of very strong and reliable secondary signatures. The preceding and other implementations involving multiple secondary signatures are readily contemplated by one of ordinary skill in the art given the teachings of the present principles provided herein, while maintaining the spirit of the present principles.

Let us take the same example mentioned herein, where a user uses his right hand index finger to swipe a pattern for the 9-Dots Pattern on the Android® phone with a curling pinky. This can be implemented using technology from Leap Motion®, where gestures can be detected. The Leap Motion® technology can be implemented as a sensor on the Android phone. Through modeling of the gesture as described, a repeating inherent gesture can be detected and used as a secondary signature. Of course, the present principles are not limited to use of technology from Leap Motion® and, thus, other gesture recognition devices, systems, and approaches can also be used in accordance with the teachings of the present principles, while maintaining the spirit of the present principles.

Another example relates to the use of the present principles with any other authentication method that involves some sort of intentional user movement. Thus, for example, while the user is performing such intentional movement which, in an embodiment, can serve as a primary signature, one or more inherent expressions of the user can be detected as used as one or more secondary signatures. In this way, overall authentication security is enhanced.

Yet another example is related to a regular password input. One possible habit when inputting the password is that the user may sub-vocalize which causes lip movements, a lisp or stutter, or they may habitually make other facial expressions. The lip movement, stutter and facial expression could be used as three separate secondary passwords. This could be accomplished using a camera as the sensor, together with lip recognition, noise recognition, facial expression recognition and modeling technique (for example, the Open Source Computer Vision (OpenCV) computer vision library from Intel® provide such capability). Through modeling of the lip, noise and facial expression as described, the three repeating inherent expressions can be employed as a "failover" of each other and used in a continuous learning embodiment.

Still another example is related to a 10 character password input for an online game account. One possible characteristic when inputting the password is that the user's blood pressure gradually increases and peaks at the $5^{th}$ character input. The entire blood pressure movement can be modeled as a function of time, and mapped to the time-sequence of each character being inputted. Alternatively, the peak blood pressure can be mapped to the $5^{th}$ input character.

A further example is related to a user being asked to speak their password. The user utters the phrase "tea cup". When the user utters the phrase, due to the structure of the user's teeth, a whistling sound is emitted concurrently with the "c" in "cup". Hence, in this example, the primary signature is the utterance "tea cup", and the secondary inherent expression is the whistling sound that the user emits when uttering the phrase "tea cup", that is while the user is providing the primary signature.

Yet a further example relates to the user being asked to speak their password. The user utters the phrase "tea cup". When the user utters the phrase, the user also moves his right thumb. Hence, in this example, the primary signature is the utterance "tea cup", and the secondary inherent expression is the movement of the user's right thumb.

To elaborate, let us consider the case where the primary Signature involves multiple steps and/or parts (for example, but not limited to, multiple keyboard inputs, multiple clicks of a mouse, or based on time), each of these steps could be mapped to steps and/or parts in the secondary signature. Thus, with respect to the above example, if the blood pressure peaked at the 8th character (where the peak is expected at the $5^{th}$ character), the authentication will fail.

Accordingly, upon authenticating the individual, the individual can be allowed certain permissions, such an entering a secured facility, using a secured device, accessing a bank account over the Internet, and so forth. Moreover, the authentication can be linked to further actions such as unlocking an entry point into the secured facility or secured device and so forth. These and various other applications to which the present principles can be applied are readily determined by one of ordinary skill in the art, while maintaining the spirit of the present principles.

We now describe various differences between the present principles and various prior arts.

The authentication approach proposed in accordance with the present principles is different than a simple extension from gesture based computer interaction into a security method. For gesture-based computer interaction, the algorithms do their best to ignore unrelated details of a gesture. In contrast, the present principles involve the opposite. That is, the present principles deliberately intend to capture what other security methods ignore, by utilizing the latest technologies to capture the subtlest of details surrounding entry of a primary signature for use as a secondary signature.

The authentication approach proposed in accordance with the present principles is different than a simple extension of behavioral biometric, for example, using typing style (e.g., rhythm, speed of typing or swiping) for authentication. These behavioral biometric algorithms use a specific human body part (e.g. the finger, the eye ball, and so forth) that interacted with the input device to determine the repeatable behavior. For example, if the right hand index finger and the right hand thumb are used for a touch screen "zoom" function, then the behavior of the index finger and thumb are studied and used for authentication. The other fingers or the other hand are not used to provide input to the input device, and therefore, they are not used for authentication purpose. The present principles propose to use the other fingers, the other hand or other body parts that are not used to provide input to the input device, for authentication purposes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C)

only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    training, by a processor, for one or more secondary signatures of a user;
    identifying, by the processor, one or more inherent expressions of the user as the one or more secondary signatures;
    authenticating, by the processor, the user using a primary signature and at least one of the one or more secondary signatures; and
    unlocking, by the processor, a lock to permit the user access to a locked item responsive to an authentication of the user using the primary signature and one or more of the secondary signatures,
    wherein the one or more inherent expressions are unintended expressions performed by the user (i) in relation to the user providing the primary signature (ii) while being unrelated directly to the physical, intentional interaction of the user providing the primary signature, and wherein each of the primary signature and the at least one of the one or more secondary signatures are used as separate identification factors in a multi-factor authentication of the user:
    wherein the one or more inherent expressions comprise one or more sounds produced by the use.

2. The method of claim 1, wherein the one or more inherent expressions are performed by the user concurrently with the user providing the primary signature.

3. The method of claim 1, wherein said training step comprises identifying the one or more inherent expressions over multiple primary signature providing sessions performed by the user.

4. The method of claim 1, wherein said training step comprises:
    monitoring a user while a user is providing a primary signature a plurality of times to detect the one or more inherent expressions of the user;
    performing an evaluation to evaluate the one or more inherent expressions of the user for certain criteria; and
    storing, in a memory device, the one or more inherent expressions of the user as the one or more secondary signatures of the user based on a result of the evaluation.

5. The method of claim 4, wherein the certain criteria comprises one or more of a similarity and a probability of reoccurrence.

6. The method of claim 4, wherein said training step is repeatedly performed to update the one or more inherent expressions for use as the one or more secondary signatures.

7. The method of claim 4, wherein said training step is repeatedly performed to replace at least one of the one or more inherent expressions with at least another inherent expression as at least one of the one or more secondary signatures.

8. The method of claim 1, wherein said training step comprises modeling the one or more inherent expressions.

9. The method of claim 1, further comprising performing a physical action by a machine or device responsive to an authentication of the user using the primary signature and one or more of the secondary signatures.

10. A non-transitory article of manufacture tangibly embodying a computer readable program which when executed causes a computer having a processor to perform the steps of claim k
    training, by the processor, for one or more secondary signatures of a user;
    identifying, by the processor, one or more inherent expressions of the user as the one or more secondary signatures;
    authenticating, by the processor, the user using a primary signature and at least one of the one or more secondary signatures; and
    unlocking, by the processor, a lock to permit the user access to a locked item responsive to an authentication of the user using the primary signature and one or more of the secondary signatures,
    wherein the one or more inherent expressions are unintended expressions performed by the user (i) in relation to the user providing the primary signature (ii) while being unrelated directly to the physical, intentional interaction of the user providing the primary signature, and wherein each of the primary signature and the at least one of the one or more secondary signatures are used as separate identification factors in a multi-factor authentication of the user:
    wherein the one or more inherent expressions comprise one or more sounds produced by the use.

11. A system, comprising; a hardware processor configured to:
    train for one or more secondary signatures of a user;
    identify one or more inherent expressions of the user as the one or more secondary signatures;
    authenticate the user using a primary signature, and at least one of the one or more secondary signatures; and
    unlock a lock to permit the user access to a locked item responsive to an authentication of the user using the primary signature and one or more of the secondary signatures,
    wherein the one or more inherent expressions are unintended expressions performed by the user (i) in relation to the user providing the primary signature (ii) while being unrelated directly to the physical, intentional interaction of the user providing the primary signature, and wherein each of the primary signature and the at least one of the one or more secondary signatures are used as separate identification factors in a multi-factor authentication of the user:
    wherein the one or more inherent expressions comprise one or more sounds produced by the user.

12. The system of claim 11, wherein the one or more inherent expressions are performed by the user concurrently with the user providing the primary signature.

13. The system of claim 11, wherein the one or more inherent expressions are performed by the user before or after, and in relation to, the user providing the primary signature.

14. The system of claim 11, further comprising a memory device, and wherein said secondary signature trainer hardware processor monitors a user while a user is providing a primary signature a plurality of times to detect the one or more inherent expressions of the user, performs an evaluation to evaluate the one or more inherent expressions of the user for certain criteria, and accepts the one or more inherent expressions of the user as the one or more secondary signatures of the user based on a result of the evaluation.

15. The system of claim 14, wherein the certain criteria comprises one or more of a similarity and a probability of reoccurrence.

16. The system of claim 14, wherein said secondary signature trainer hardware processor updates the one or more inherent expressions for use as the one or more secondary signatures.

17. The system of claim 14, wherein said secondary signature trainer hardware processor replaces at least one of the one or more inherent expressions with at least another inherent expression as at least one of the one or more secondary signatures.

18. The system of claim 11, wherein at least part of the at least of the one or more secondary signatures is different from another part of the at least one of the one or more secondary signatures, and a timing of the at least part of the at least one of the one or more secondary signatures is correlated by the hardware processor to a timing of at least part of the primary signature in order to authenticate the user.

* * * * *